United States Patent

[11] 3,558,989

[72] Inventors Guy Dameme;
Gerard Fourichon, Paris, France
[21] Appl. No. 703,093
[22] Filed Feb. 5, 1968
[45] Patented Jan 26, 1971
[73] Assignee Societe Lignes Telegraphiques Et Telephoniques
Paris, France
a joint-stock company of France
[32] Priority Mar. 24, 1967
[33] France
[31] 100,140

[54] SEMICONDUCTOR PROTECTIVE DEVICE
4 Claims, 6 Drawing Figs.

[52] U.S. Cl. .......... 317/41, 317/234, 337/1, 337/4, 338/234
[51] Int. Cl. .......... H02w 5/04, H01l 85/00
[50] Field of Search .......... 317/33, 40, 41, 9, 234/4, 235; 338/234; 337/176, 142, 158, 4

[56] References Cited

UNITED STATES PATENTS

| | | | |
|---|---|---|---|
| 3,402,325 | 9/1968 | Minks .......... | 317/234/4 |
| 3,408,542 | 10/1968 | Dautzenberg et al. .......... | 317/235/4 |

FOREIGN PATENTS

| | | | |
|---|---|---|---|
| 989,306 | 4/1965 | Great Britain .......... | 317/234/1 |

*Primary Examiner*—J. D. Miller
*Assistant Examiner*—Harvey Fendelman
*Attorney*—Kemon, Palmer and Estabrook

ABSTRACT: A fast acting circuit protection device includes a calibrated wire connected in series with a bar of semiconductive material and both components are housed in a vacuum tight casing filled with a controlled atmosphere. The semiconductor which may be silicon or gallium arsenide has a resistivity versus temperature characteristic which is substantially an inverted V-shape in the range from about 0 to 350° C.

Inventors:
Guy Dameme
Gerard Fourichon
By
Hemon, Palmer, Stewart & Estabrook
Attorneys Inventors:
Guy Dasnome
Gerard Fourichon
By
Kemon, Palmer, Stewart & Estabrook
Attorneys Inventors:
Guy Dameme
Gerard Fourichon
By Kemon, Palmer, Stewart & Estabrook
Attorneys Inventors:
Guy Damonno
Gerard Fourichon
By: Kemon, Palmer, Stewart & Estabrook
Attorneys

SEMICONDUCTOR PROTECTIVE DEVICE

BACKGROUND OF THE INVENTION

As is well known, many newly designed electronic circuits incorporate components highly sensitive to sudden surge intensities which may come from a modification in the supply operating conditions such as a change in the load impedance. The current sensitivity of the circuits lately increased through an use of semiconductor components such as transistors and dry electrolytic capacitors in which the electrolyte is itself a semiconductor. According to current practice, such transistorized circuits are fed from a low voltage (about 24 Volts) supply connected to the mains. Rectification, filtering and stabilizing are performed in the supply. It is designed to deliver a given power through a given load, which is the impedance of the circuit operating under normal conditions. If a failure occurs, such for instance as short circuiting in a capacitor, the load may suddenly decrease. The current supplied will immediately increase which may definitively damage some circuit components other than the one responsible for the failure. It is current practice to introduce a fuse in series between the supply and the load circuit. Burning out of the fuse at a preset limit current will disconnect the supply from the circuit and prevent such damage. French application filed on Jan. 2, 1967 by the applicant now French Pat. No. 1,517,854 describes the operation of the protected system: supply plus load circuit. The component according to the present invention is advantageously used in the circuit described in the above application.

Commercially available electrical fuses which consist mainly of a calibrated wire, show some important drawbacks when operated under the above conditions. Indeed, most of the low voltage supplies incorporate high capacity filtering capacitors (current practice values range from 50 to 300 $\mu$F in the case of load circuit impedances rated at 20 Ohms). On switching on the charge current through such filtering capacitors may reach, or even be higher than, the limit value which the circuit cannot tolerate without damage under steady state conditions. It is well known that the duration of the transient is not sufficient to burnout the fuse. However repeated switching on will after some time destroy the fuse even under normal condition due to additive partial damaging of the wire and this is objectionable from the user's point of view. Time constant is another important characteristic of the fuse. That is the time which elapses between the instant when the surge is applied and the instant when the load is actually disconnected from the supply. This time constant varies with overrating and preset current limit value. As an example, a given type of commercially available fuse rated at 24 v., 100 ma has a time constant of 1 second at 200 percent overrating of the limit current. The 1 second value is too long to provide a highly reliable protection of the sensitive components in the load circuit. It is also too near from the filtering capacitor charge time constant to provide for a stable operation. A third drawback of such a fuse lies in its dimensions which do not match any more the size of microminiaturized circuits.

BRIEF DISCLOSURE OF THE INVENTION

The basis of the invention lies in the temperature dependence of the resistivity of some semiconductors. According to experiments, properly doped semiconductors show a logarithm of the resistivity versus temperature curve as follows: starting from the room temperature end (25° C), and increasing the temperature, the variation is first linear with a positive slope up to a maximum, the resistivity then linearly decreases with a slope higher than the slope of the first increasing part up to a value lower than the room temperature value; the resistivity keeps on decreasing as the temperature increases according to a nonlinear law so as to reach asymptotically a very low value. The parameters of the different parts of the curve depend upon the nature of the semiconductor and the doping level. Experiments have shown that some of the most currently used semiconductors under selected doping levels, such as silicon and gallium arsenide for instance, display resistivity curves of the above type. The parameters of the curve such as the temperature of the maximum can be matched to the operating conditions through selection of the semiconductive material and the concentration and nature of the doping impurity.

The device according to the invention consists mainly in a bar of semiconductor material showing a resistivity versus temperature variation as mentioned above connected in series with a calibrated conductive wire, both ends of said series connected parts being connected to an independent output lead, the common point being either connected to an external lead or only to an internal lead providing for a thermal contact. The semiconductive material is selected so that under normal operating conditions the thermal equilibrium inside the housing will bring the bar at a temperature corresponding to a point of the first part of its resistivity versus temperature curve as described above. Under limit current, the thermal equilibrium will bring the temperature of said bar to a value corresponding to the second part of said curve and corresponding to a lower resistivity value than said first point. The wire is calibrated so as to burn out under the current through the device under such conditions, after thermal equilibrium is reached. The time constant of such device is reduced through decrease of the thermal resistance through three thermal contacts established at both terminals of the device and at the common point between the rod and the wire. The design is such that the time constant remains higher than the buildup time constant of the charges on the filtering condensers of the supply.

Introducing thermal connection at the common point between the semiconductor bar and the calibrated wire allows for a high reproducibility of the thermal flow inside the device and therefore of the temperature under equilibrium. The provision of three thermal contacts in the device leads to a better control and higher adjustability of the time constant of said device and allows also to lower it with respect to the values in prior art structures.

Selection of the semiconductive material as explained above allows the device to operate in two different ways:

a. under normal operating conditions, any increase of current will increase the operating temperature and thereby the resistance of the device which will oppose to further increase of current. The device operates as a current regulator.

b. under limit current operation the temperature is such that the resistance of the device is lowered to a value such that the flow of current will fuse out the calibrated wire. The device operates as a protecting device. Any further increase in the current will decrease the resistance of the device which amplifies such a current increase and reduces the time necessary to fuse the wire. The device operates as a current amplifier.

PRIOR ART

U.S. Pat. No. 2,953,759 filed on July 1, 1953, entitled "Semiconductor resistor" explains the physical basis of the resistivity variation with temperature in a semiconductive material and claims the manufacture of temperature independent resistors or resistors with a preset temperature coefficient which will remain constant in the operating range. It is known from prior art to associate a resistor to a fuse. For instance French Pat. No. 1,461,371 filed on Mar. 12, 1965 discloses a device consisting of a film or wire wound resistor, which is interrupted so that a fuse, either as a film or as a wire, may be connected in the resistive path, thereby providing intimate thermal contact between the fuse and the resistor.

On the other hand the use of a semiconductor rod ohmically connected to two output leads as a thermosensitive resistor has been described in the French Pat. No. 1,387,940 filed on Dec. 13, 1963. The resistance of the gold doped silicon rod used decreases with increasing current in the operating range so as to allow compensating the nonlinear characteristics of some other circuit components the resistivity of which increases with the current. As will be readily appreciated this device is not based on the use of the whole range of the resistivity variation as the present invention is. The use of a semiconductive rod as resistor increasing with the temperature in the whole operating range has also been disclosed. In this case also, the semiconductor characteristics are chosen so that the temperature coefficient of the resistor keeps the same sign in the whole operating range.

French Pat. No. 1,463,448 filed on Jan. 11, 1966 uses a semiconductive wafer containing two doping impurities as a temperature independent resistor. This invention is based on the fact that the resistivity variations with temperature in a given temperature range can be compensated in the semiconductor by the opposing influence due to the two impurities. Due to the displacement of the resistivity curves along the temperature axis according to the nature of the impurity, a given temperature corresponds to part of the curve with a positive slope for the semiconductor containing the first impurity and with a negative slope for the same semiconductor containing the second impurity. The physical basis of the invention is the same as the one of the present invention. The devices are quite different.

DETAILED DESCRIPTION

The invention will be better understood by reference to the following description and drawings given as illustrations of the invention in which.

Figure 1:
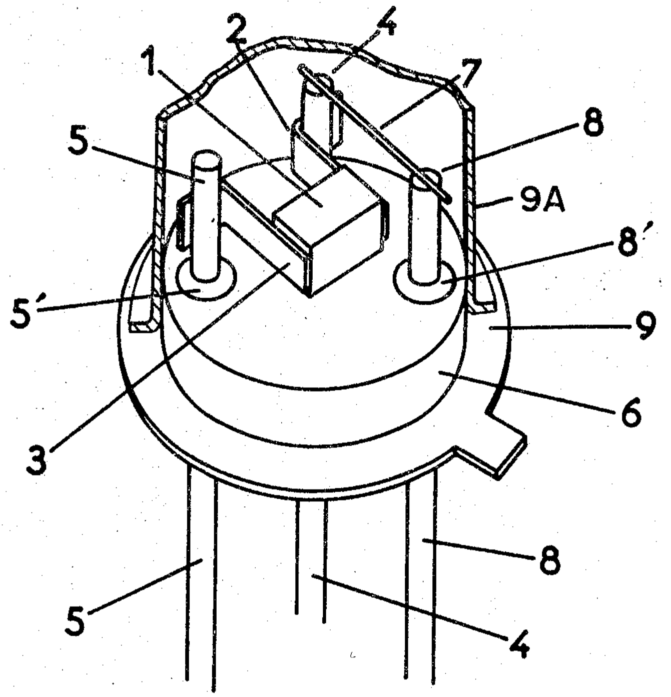
FIG. 1 shows an inside view of one embodiment of the invention, header removed.

The semiconductor bar 1 on FIG. 1 is welded at both ends to metal corner plates 2 and 3 the other ends of which are respectively connected to the output pins 4 and 5. Pins 4 and 5 are insulated from metal base 6 by means of beads 4′ and 5′. A calibrated wire 7 is connected between pins 4 and 8. It is thereby series connected to the semiconductor wafer between output pins 5 and 8. Bead 8′ insulates pin 8 from the conductive base 6. A header, or envelope 9A shown partially in FIG. 1, is welded or otherwise connected to the base along flange 9 so as to constitute an airtight envelope for the device. The air inside the envelope is pumped off and replaced by a controlled atmosphere providing a more reliable environment for the semiconductor wafer as is well known from the man of art. Under operating conditions, pin 5 is connected to the load to be protected and pin 8 to the supply. In reference to FIGS. 3 and 4, it will be explained how to select the semiconductor material and how to calibrate wire 7. The preset limit current sets the wire parameters. The thermal equilibrium established under such a current value is the limit temperature. The technology used for welding the plates at both ends of the rod is chosen accordingly so as to ensure that the welds suffer from no damage at said temperature. It is indeed essential that the open circuit be provided by fusion of wire 7 and not through destruction of the welds. High temperature welding of semiconductor material is well known from the technician. It requires usually the use of several intermediate layers between the semiconductor material 1 and the corner plates 2 and 3, with the necessary thermal treatments to provide alloying of the several layers to the semiconductor material and between themselves. In order to reduce the time constant of the device the diameter of the wire 7 is chosen the smallest possible. Limitation is due to technology requirements and availability of wire of small diameter. Interconnecting of wire 7 is obtained by thermocompression at the free ends of the pins. The embodiment of FIG. 1 is housed in a T05 standard semiconductor device casing. Rod 1 is made of phosphorus doped *n*-type silicon with a room temperature resistivity between .5 and 10 Ohms-cm. depending on the resistance required by the load and associated supply parameters. The rod is 2 mm. long and has a square cross section of 1.1 mm. Corner plates are made of a gold plated nickle-iron alloy, and so is base 6. Wire 7 is a 50 to 7 micron diameter gold wire. The device corresponding to the technical data of FIG. 5 is made with a 50 micron wire. Intermediate pin 4 may be connected to an alarm device such as a relay, pilot lamp etc. ..., the other connection of which is in contact with pin 8.

Figure 2:
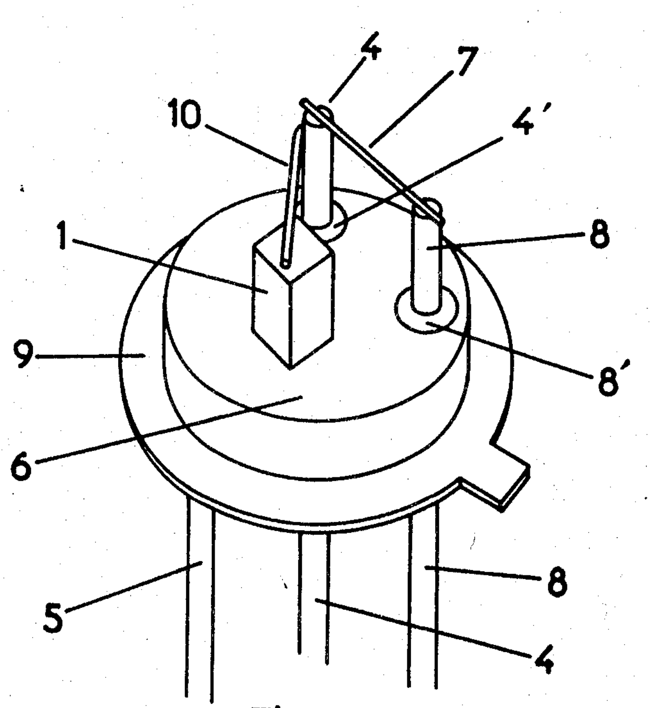
FIG. 2 shows the same view of another embodiment of the invention.

In the embodiment shown in FIG. 2, one end of semiconductive rod is welded to the base 6. The other end is connected to intermediate pin 4 by the gold wire 10. Calibrated wire 7 is connected between pins 4 and 8. Output pin 5 is externally connected to base 6. The thermal contact between the wafer and the base provides for an improved cooling of the latter with respect to the previously described embodiment. The current limit can thereof be increased with respect to that of the previously described embodiment.

Figure 3:
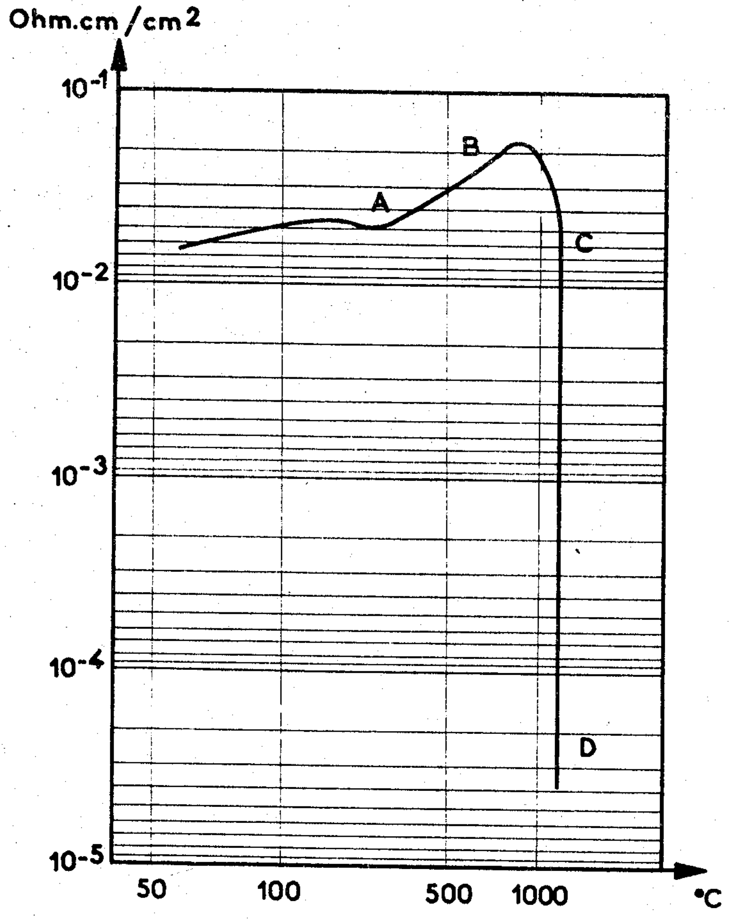
FIGS. 3 and 4 are explanative of the operation of the device.

As already mentioned, the physical basis of this device lies in the variation of the resistivity of the semiconductor material with respect to temperature. FIG. 3 reproduces experimental curves taken from page 165 of the French book entitled "Les Semiconducteurs" written by Messrs. Goudet and Meuleau, published by Edition Eyrolles in 1957. They all concern silicon, with different boron concentrations. Curve I corresponds to 6.7 $10^{24}$ boron atoms per m.$^3$, curve II to 2.7 $10^{24}$ atoms per m.$^3$, curve III to 1.3 $10^{24}$ atoms per m.$^3$ and curve IV to 6.7 $10^{23}$ atoms per m.$^3$. The curves are quite similar. When heating from room temperature, the resistivity logarithm increases linearly up to a maximum. The corresponding temperature varies with the boron concentration between 220° and 300° C in the range considered. The linear increasing parts are labeled AB in the FIG. After the maximum, the resistivity logarithm decreases linearly as shown at CD in the FIG. It can easily be appreciated that the slopes of the decreasing CD parts are larger than the slopes of the increasing AB parts. When the semiconductor is operated at a temperature corresponding to the AB part, any increase of current will increase its temperature through ohmic losses and thereby its resistance. And vice versa, thus the semiconductor will oppose to any current variation. The device operates as a current regulator. If the current increase is such that the temperature becomes higher than that corresponding to the maximum of the curve, the resistance of the rod will suddenly decrease leading to a further current increase and a further temperature increase, and so on. The device will then amplify the current variations. This amplifying action may be very quick since this type of operation does not require the establishment of the temperature equilibrium. When the normal operating point is sufficiently near from the maximum along AB, any current variation sufficient to bring the wafer on the other side of the maximum will be amplified. This amplification effect is the basis of the high reliability of the burning out of wire 7. Curves concerning other samples of silicon are also given p. 167 in the book entitled "Silicon Semiconductor Technology" written by Runyan, published by McGraw Hill in 1965. The maximum of the curves are to be found between 150° and 700° C. The highest maximum occurs at 500° C and is obtained with *n*-type silicon doped with $10^{17}$ atoms per cm.$^3$ of phosphorus.

Figure 4:
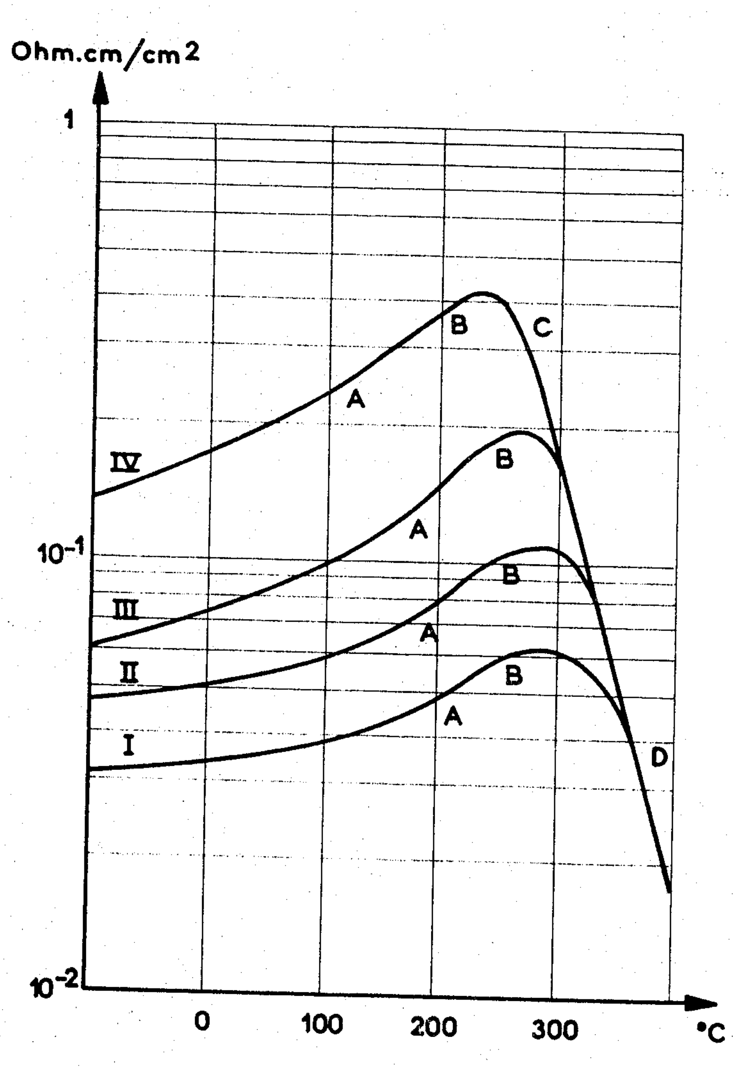
Figure 5:
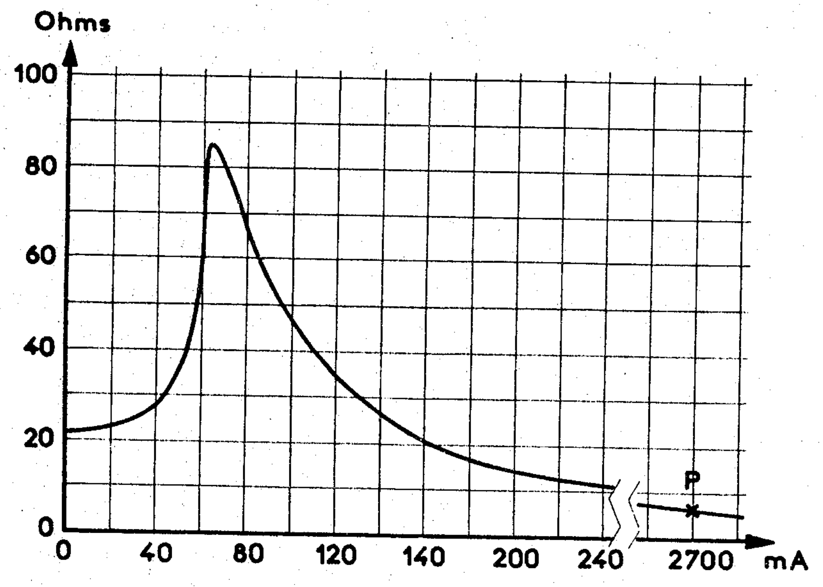
FIGS. 5 and 6 are technical data concerning the device of FIG. 1.

FIG. 4 shows the same curves for another semiconductor material: *p*-type gallium arsenide according to AD report 236,515 as issued by the Armed Services Technical Information Agency. The shape of the curve surrounding the maximum looks much like that for silicon. The maximum occurs at higher temperature. The decrease after the maximum is steeper than for silicon. 3

In order to select the proper material for a given device, curves of the type shown on FIG. 3 should be available. Usable materials should show a pronounced maximum. It can be seen that all the materials are not suitable to design a device of the invention. For instance referring to the first book mentioned above, page 165 shows that the resistivity curve of *p*-type silicon doped with 1.3 $10^{25}$ boron atoms per m.$^3$ is monotonous (it does not show a maximum). Therefor, this material is unsuitable. On the other hand the temperature of the maximum should be acceptable from the manufacturing and operating point of view.

The limiting parameter is usually the highest temperature which the welds will allow. Indeed as already mentioned reproducibility of the device requires that the open circuit be provoked by the fusion of the calibrated wire and not through unreliable destruction of the welds between the wafer and the leads.

When the device is to operate as a protecting device between a constant voltage supply and a load circuit the design of the device is preset by the following operating conditions:

(1°) normal operating current or normal operating resistance value (this is the rated operating current flow from the supply through the load);

(2°) the surge which it will allow without being damaged for a given duration (this should take care of the transient charging current of the filtering capacitors of the supply);

(3°) the fusing current of the wire in a given time.

The normal operating current and the voltage of the supply allow to select the operating resistance of the device. This operating resistance is the resistance at the temperature equilibrium reached under steady flow of the normal operating current. This temperature should correspond to the AB part of the resistivity curve and should be acceptable from the technological point of view (welds). The shape ratio of the rod is usually set by mechanical reasons. Given this ratio the above condition allows selection of the proper material from a set of curves such as shown in FIGS. 3 or 4. When this is done, the room temperature resistance of the wafer is set. It is assumed that the duration of the transients is not sufficient to allow establishment of a new temperature equilibrium and that any increase in temperature due to a surge will disappear so that the device comes back to steady stade temperature. During a surge, the wafer acts as a current limiter as explained above. It is however necessary to check that the transient values (current and duration) will not fuse wire 7 as explained further with reference to the data in FIG. 6. The third data is used to calibrate wire 7. The time taken by wire 7 to fuse depends on its shape ratio and on the conditions of the thermal equilibrium inside the casing. Technology fixes usually the nature of the metal.

Figure 6:
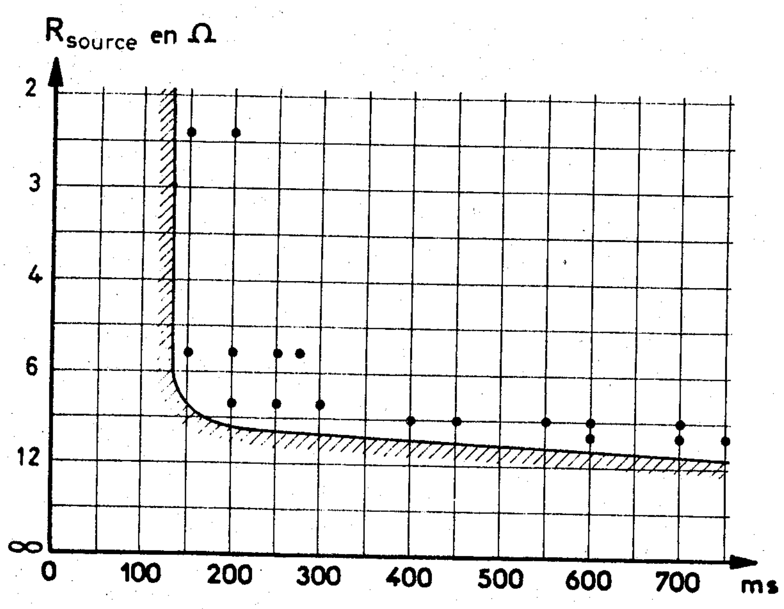

FIGS. 5 and 6 show measured characteristics of a device made according to FIG. 1. FIG. 5 shows the variations of the resistance of the device versus the current flow. Each point on the curve was measured after stabilization of the resistance value under constant current feed. The curve shows a pronounced maximum between two almost linear parts. The slopes of both parts are quite alike. The curve ends in a nonlinear part which seems to tend towards an asymptotic value. The curve has been continued far away from the origin. Point P on the curve corresponds to the fusion of wire 7.

The points on FIG. 6 show the time constant of the device, that is the time required by the wire to fuse, versus the internal impedance of a constant voltage supply (which is a measure of the current through the device). Each point is the measure of the time taken by the wire to fuse starting at room temperature. Under normal operating conditions, the normal operating current has flown previously through the wire which is in temperature equilibrium with the semiconductor rod. The time necessary to provoke the fusion is therefor slightly shortened with respect to the plotted values. The locus of the plotted points is a curve which separates the FIG. plane into two parts. Any point located above the curve, fixes a couple of conditions (current and time) under which the device will provide protection through fusion of wire 7. The curve of FIG. 6 is the locus of the limit conditions at which fusion occurs. For any couple of conditions corresponding to a point of the plane of FIG. 6 located under the curve, protection is no longer provided for by the associated device. The user is supplied by the component manufacturer with FIGS. 5 and 6 for each component.

We claim:

1. A nonlinear resistive device for connection in series between a constant voltage source and a load comprising:

first means for opposing any current variation from a first preset low current value;

second means connected in series with said first means and having a preset time lag for increasing the resistance of said device to an infinite value in response to the flow through said device of a second predetermined high current value; and third means including an airtight gas filled envelope housing said first and second means for quickly establishing thermal equilibrium within said first means under conditions of varying currents through said device.

2. A nonlinear resistive device according to claim 1 in which said first means is a rod of semiconductor material having a substantially inverted V-shaped resistivity versus temperature characteristic in the 0 to 350° C. range and said second means is a wire of a few microns in diameter.

3. A nonlinear resistive device according to claim 2 in which said semiconductor is silicon.

4. A nonlinear resistive device according to claim 2 in which said semiconductor is gallium arsenide.